United States Patent
Gullner et al.

[19]

[11] Patent Number: 6,127,921
[45] Date of Patent: Oct. 3, 2000

[54] ALARM DEVICE AND METHOD FOR ACTUATION OF AN ALARM DEVICE

[75] Inventors: Sven-Åke Gullner, Västra Frölunda; Kjell Olsson, Sätila, both of Sweden

[73] Assignee: AB Volvo, Göteborg, Sweden

[21] Appl. No.: 09/125,914

[22] PCT Filed: Feb. 28, 1997

[86] PCT No.: PCT/SE97/00346

§ 371 Date: Nov. 5, 1998

§ 102(e) Date: Nov. 5, 1998

[87] PCT Pub. No.: WO97/31806

PCT Pub. Date: Sep. 4, 1997

[30] Foreign Application Priority Data

Feb. 29, 1996 [SE] Sweden .................................. 9600829

[51] Int. Cl.[7] .................................................. B60R 25/10
[52] U.S. Cl. .......................... 340/426; 340/430; 340/528; 340/565
[58] Field of Search ................................ 340/425.5, 426, 340/430, 527, 528, 565

[56] References Cited

U.S. PATENT DOCUMENTS 5,477,206  12/1995  Rodriquez ................................ 340/430

FOREIGN PATENT DOCUMENTS

| 0 428 432 A1 | 5/1991 | European Pat. Off. . |
| 0 449 683 A1 | 10/1991 | European Pat. Off. . |
| 0 457 661 A1 | 11/1991 | European Pat. Off. . |
| 0 457 662 A1 | 11/1991 | European Pat. Off. . |
| 44 24 229 C1 | 9/1995 | Germany . |

*Primary Examiner*—Daryl Pope
*Attorney, Agent, or Firm*—Royston, Rayzor, Vickery, Novak & Druce, L.L.P.

[57] ABSTRACT

Vehicle alarm devices and methods for activating such devices are disclosed. The alarm device includes a first sensor for detecting the presence of living beings within the vehicle and generating a first signal, a second sensor for detecting the exit of a passenger from a vehicle and generating a second signal, an alarm, a controller for activating the alarm based upon receipt of one of the two signals, and a time delay unit for initiating a first time delay for activation of the alarm after receipt of the second signal from the controller and for initiating a second time delay for activation of the alarm after receipt of the first signal during the first time delay, and thereby extend the first time delay, and for further initiating the second time delay for activation of the alarm after receipt of the first signal during the second time delay to thereby further extend the second time delay.

7 Claims, 3 Drawing Sheets

6,127,921

ALARM DEVICE AND METHOD FOR ACTUATION OF AN ALARM DEVICE

FIELD OF THE INVENTION

The present invention relates to an alarm device. More particularly, the present invention relates to a method for actuation of an alarm device. In particular, the present invention relates to alarm devices which are intended to prevent thefts and burglary in connection with motor vehicles.

BACKGROUND OF THE INVENTION

In connection with vehicles, for example passenger cars, different kinds of alarm systems are used to detect burglary or attempted theft of the vehicle. If such a situation is detected, the alarm system normally emits an acoustical and/or optical alarm signal in order to attract attention so that the burglary or theft of the vehicle can be prevented. The alarm signal can also be combined with the actuation of a device which is arranged to prevent the vehicle from being started.

In alarm systems for vehicles, the use of so-called space sensors is known, i.e. sensors which detect possible movement of people or animals within a certain area. This area, in the application in question, corresponds to the passenger compartment of the vehicle. Such space or motion sensors are previously known, and can be in the shape of, for example, ultrasound sensors or microwave sensors. A space sensor which is intended for use in connection with vehicles is normally connected to a computer-based alarm control unit which is arranged to emit an alarm signal if the sensor detects movement within its area. In the event of an alarm, the alarm control unit can also be arranged to prevent the vehicle from being started, for example by deactivating the starter motor of the vehicle.

In some situations there is a need for an alarm system for vehicles which comprises a sensor and in which the alarm system is automatically activated when the driver leaves the vehicle. This function is normally required for reasons of comfort, so that the driver for example does not need to activate a switch in order to activate the alarm function. In order to achieve this automatic activation, switches in the doors of the vehicle are normally used, which switches are connected to the alarm control unit. In this manner, the alarm control unit can determine whether the doors are open or closed. The alarm control unit can detect the fact that at least one door has been opened, and subsequently that all of the doors have been closed, which is taken to mean that the driver has left the vehicle. Following this, the alarm can be activated. If motion is subsequently detected in the passenger compartment of the vehicle by means of the sensor, the alarm will be triggered.

In the above-described system, there is normally is an automatic delay in activation of the alarm, so that it is activated a certain time after the driver has left the vehicle. This means that when the last door has been closed, the alarm control unit will initiate a time delay of, for example, 30 seconds. When this period of time has passed, the alarm is activated and will be triggered as normal if the sensor detects movement in the passenger compartment of the vehicle.

In connection with the above-mentioned alarm system, there is a problem in those cases where the driver leaves the vehicle at the same time as, for example, a child or a pet is left in the vehicle. In such a case, the sensor will trigger immediately after the above-mentioned time delay has expired, which of course inconveniences those who are in the vehicle. Furthermore, the degree of attention which normally should follow a true alarm situation decreases. In addition, alarm signals, and in particular unnecessary false alarms, are a nuisance within populated areas since they disturb people in the vicinity of the vehicle.

In order to solve the above-mentioned problem, the alarm system can be equipped with some sort of control or switch which is connected to the alarm control unit, and by means of which the alarm can be deactivated when the driver leaves the vehicle, and for example a child or a pet is left in the vehicle. However, such a solution will always cause a problem since there is a risk that the driver will forget to operate this switch in order to deactivate the alarm when he intends to leave the vehicle and somebody has been left in the vehicle. On the other hand, there is a risk that the driver—if he has remembered to deactivate the alarm at a certain point in time—instead forgets to reactivate the alarm using the switch, thus causing the alarm not to be activated the next time this is necessary.

SUMMARY OF THE INVENTION

A main object of the present invention is thus to solve the above-mentioned problems, and to provide an improved alarm system which, in particular, is intended for a vehicle, and in which automatic activation of the alarm takes place without any action necessary by the user of the vehicle.

In accordance with the present invention, this and other objects have now been realized by the invention of a vehicle alarm device comprising a first sensor for detecting the presence of living beings within the vehicle and generating a first signal, a second sensor for detecting the exit of a passenger from the vehicle and generating a second signal, an alarm, a controller for activating the alarm based upon receipt of one of the first and second signals, and a time delay unit for initiating a first time delay for activation of the alarm after receipt of the second signal from the controller and for initiating a second time delay for activation of the alarm after receipt of the first signal during the first time delay, to thereby extend the first time delay, and for further initiating the second time delay for activation of the alarm after receipt of the first signal during the second time delay, to thereby further extend the second time delay. In a preferred embodiment, the time delay unit comprises a switch connected to the controller, and a relay for actuation of the switch upon receipt of the first signal. In a more preferred embodiment, the time delay unit initiates the second time delay upon interruption of the first signal, thereby deactuating the switch.

In accordance with one embodiment of the vehicle alarm device of the present invention, the vehicle includes a passenger compartment, and the first sensor comprises a space sensor disposed in the passenger compartment.

In accordance with another embodiment of the vehicle alarm device of the present invention, the vehicle includes at least one door, and the second sensor comprises a door contact associated with the at least one door of the vehicle.

According to the method of the present invention, a method has been invented for activating a vehicle alarm device comprising detecting the presence of a living being within the vehicle and generating a first signal, detecting the exit of a passenger from the vehicle and generating a second signal, activating an alarm based upon receipt of one of the first and second signals, initiating a first time delay for activation of the alarm after receipt of the second signal, initiating a second time delay for activation of the alarm after receipt of the first signal during the first time delay to thereby extend the first time delay, and further initiating the second time delay for activation of the alarm after receipt of the first signal during the second time delay, to further extend the second time delay. In a preferred embodiment, the method includes initiating the second time delay upon interruption of the first signal.

The present invention uses a first sensor for detection of the presence of living beings in the vehicle, and a second sensor for detecting that the user of the vehicle has left the vehicle. The sensors are connected to an alarm control unit which is arranged to activate an alarm depending on signals from the sensors. The invention further comprises a delay unit, which, when it receives a signal from the second sensor, initiates a time delay during which the alarm is not activated. Following this, the alarm enters an activated state. Furthermore, the first sensor is connected to means for extending the time delay in the case of a signal being received from the first sensor. In this way, an alarm system is provided with which unintentional triggering of the alarm due to the fact that somebody has been left in a vehicle with an activated alarm will not take place.

BRIEF DESCRIPTION OF THE DRAWINGS

The present invention will be described in the following detailed description in greater detail, with reference to the appended drawings, in which.

DETAILED DESCRIPTION

Figure 1:
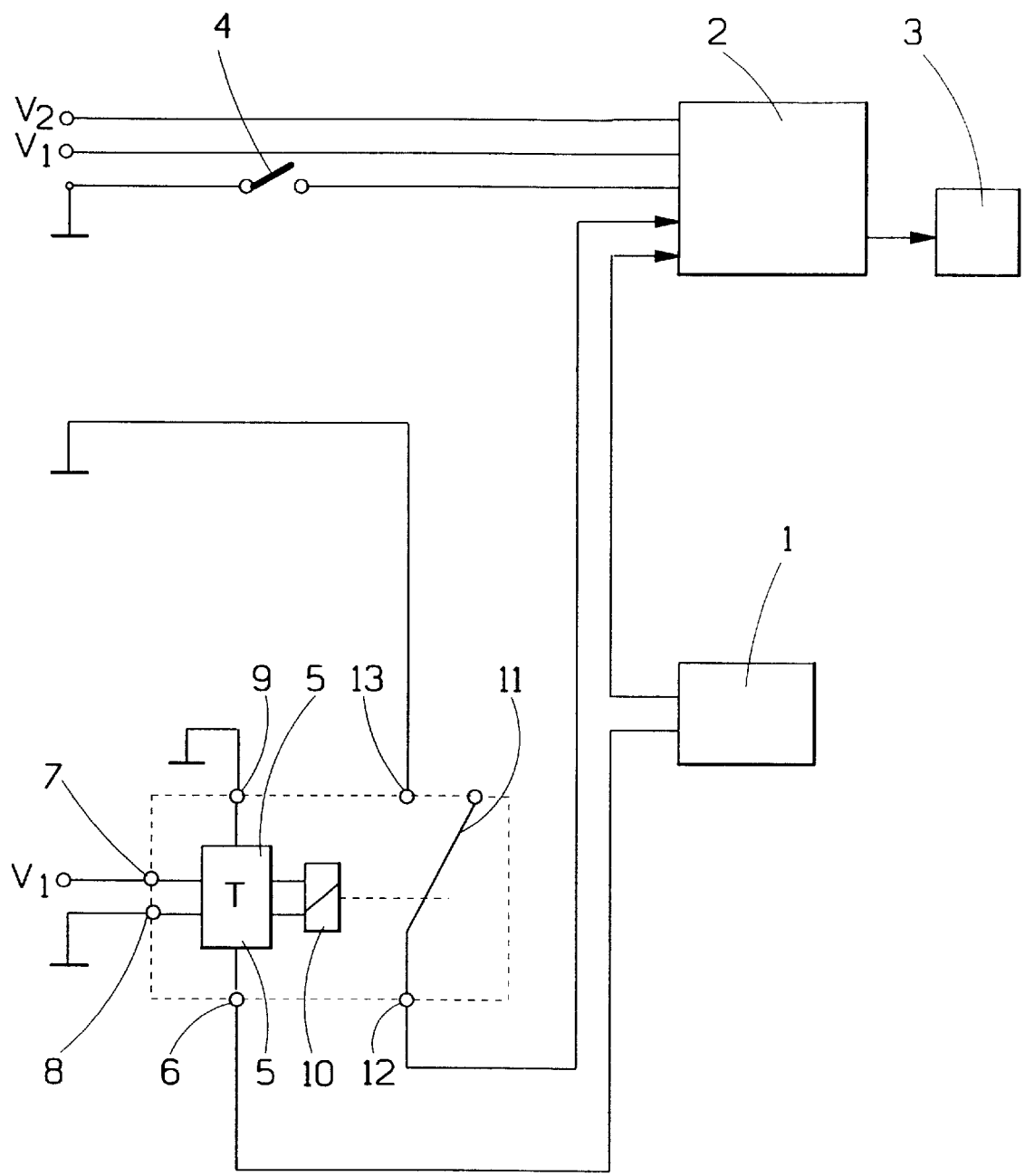
FIG. 1 is a block diagram which schematically illustrates a first embodiment of the present invention.

FIG. 1 shows a block diagram which illustrates the present invention according to a first embodiment. The invention is preferably intended to be used in connection with vehicles, and comprises a sensor device, preferably in the form of a sensor 1 which is connected to an alarm control unit 2. The sensor 1 is preferably an ultrasound sensor, but microwave sensors or similar sensors can also be used in the invention. The alarm control unit 2 is fed with a voltage $V_1$ which preferably is +12 V, and which is taken from the voltage feed system (not shown) of the vehicle. The alarm control unit 2 is also connected to the ignition lock of the vehicle, so that an ignition voltage $V_2$ is fed to the alarm control unit 2 when the ignition is on.

The alarm control unit 2, which preferably is computer-based, is connected to an alarm device 3 which is arranged to emit an acoustic and/or optical alarm signal when the alarm control unit 2 detects an alarm condition. The alarm device 3 as such is previously known, and will for this reason not be described in greater detail. The alarm control unit 2 is arranged to inhibit use of the vehicle when an alarm has been triggered, preferably by means of a (not shown) connection to the starter motor of the vehicle, which thus can be disabled when an attempt is made to start the vehicle during an alarm condition.

The sensor 1 responds to movement of people and animals within a certain distance, for which reason it is arranged at a location in a vehicle where it can detect motion within essentially the entire passenger compartment of the vehicle. If the presence of living beings is detected, a voltage is emitted which is transmitted to the alarm control unit 2.

The system also comprises a plurality of door contacts 4, which are arranged in connection to the doors or hatch (not shown) of the vehicle. For reasons of simplicity, only one door contact 4 is shown in FIG. 1. The door contact 4 is of the kind which is open when the corresponding door is closed. The door contact 4 is connected between earth and the alarm control unit 2, and functions as a second sensor which, in addition to the above-mentioned sensor 1, feeds information to the alarm control unit 2.

The present invention furthermore comprises a delay unit 5, which comprises a combined relay and timer device to which the sensor 1 is connected by means of a contact 6. There is also a voltage feed $V_1$ connected to the delay unit 5 by means of further contacts, 7 and 8. Furthermore, the delay unit 5 is connected to ground by a contact 9. The delay unit 5 is connected to a relay coil 10 which when activated is arranged to throw a switch 11. The switch 11 comprises a further contact 12 which is connected to the alarm control unit 2, and a second contact 13 which is connected to ground. The relay coil 10 when activated, i.e. when voltage is fed from the sensor 1 to the contact 6, is arranged to throw the switch 11 to a position at which the ground is connected to the alarm control unit 1, i.e. at which the contacts 12 and 13 are connected. This position corresponds to that which happens when the door switch 4 is closed, i.e. when a door is opened.

When the driver of the vehicle intends to leave the vehicle, this will be detected by the alarm control unit 2 by means of the door contact 4, which is then shut. When all of the doors have subsequently been closed, all of the door contacts which are arranged in the vehicle will be open. This will be taken by the alarm control unit 2 to mean that the vehicle has been left, for which reason the alarm should be activated. The alarm control unit 2 then, using a delay unit, initiates a delay $t_1$ of a predetermined length of time, for example 15 seconds. Following this, the alarm will be activated.

If people or animals are left in the vehicle, this will be detected by the sensor 1 during the above-mentioned period of time $t_1$. The sensor 1 then emits a voltage signal to the alarm control unit 2 and to the delay unit 5, which activates the relay coil 10 and puts the contact 11 in a closed position.

When the motion in the vehicle ceases, the voltage from the sensor 1 to the delay unit 5 will stop. Since the delay circuit 5 comprises a timer circuit, the switch 11 will not switch to its open position immediately when the voltage from the sensor 1 ceases. Instead, it will remain closed for a certain period of time $t_2$, for example 15 seconds. Subsequent to this, the switch 11 will be opened. Since the switch 11 is connected to the alarm control unit 2 in the same manner as the door contact 4, the alarm control unit 2 will interpret this condition as a door having been opened and closed.

The invention thus permits the delay unit 5 to be initiated with a certain time delay $t_2$ if motion is detected in the passenger compartment during the first-mentioned delay time $t_1$. As long as motion is subsequently detected during the time $t_2$, the delay unit 5 will be initiated again.

Figure 2:
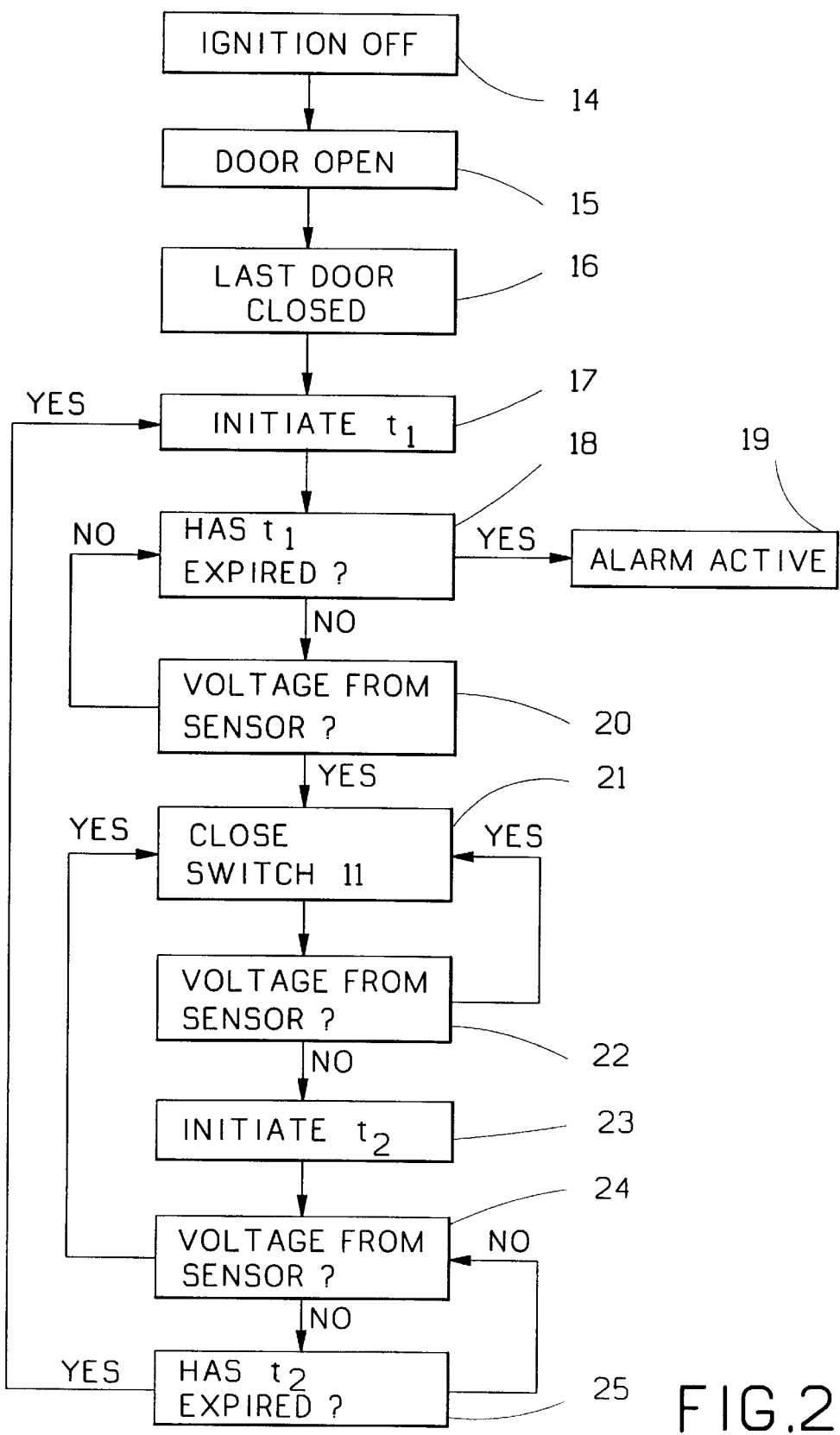
FIG. 2 is a flow-chart which illustrates the function of the present invention.

The function of the invention will now be described with reference to FIGS. 1 and 2. FIG. 2 is a flow-chart which illustrates the chain of events in the case of activation of the alarm device according to the present invention.

Initially, the vehicle is in use and all of the doors are closed, which corresponds to the door contact 4 being open. This state is detected by the alarm control unit 2. The normal course of events when the driver of the vehicle wishes to stop and leave the vehicle is to first turn off the ignition, which is detected by the alarm control unit 2 by means of the connection of the ignition voltage $V_2$. This is illustrated by block 14 in FIG. 2. When any of the doors is subsequently opened, the door contact 4 will be shut, which will be detected by the alarm control unit 2 (block 15). If other doors are subsequently opened, this will be detected in a corresponding manner by (not shown) further door contacts. When the last door is closed, the door contact 4 is again opened, which is detected by the alarm control unit 2 as the vehicle having been left (block 16). This will cause a first time delay $t_1$ to be initiated in the alarm control unit 2 (block 17). This time delay $t_1$ is set to an appropriate value, for example 15 seconds, and if this has expired (block 18) the alarm system will be activated (block 19). In this case, an alarm will be triggered in the event of a subsequent reception of a signal from the sensor 1.

The present invention is arranged to prevent undesired alarms which are caused by leaving a person or an animal in the vehicle. For this purpose, the sensor 1 is also connected to the delay unit 5. When the system is in a state where the time $t_1$ has not yet expired and a movement takes place in the passenger compartment of the vehicle, the sensor 1 will detect this, and emit a voltage to the one contact 6 of the delay unit 5 (block 20). This will cause the relay coil 10 to be activated, which in turn will cause the switch 11 to be activated so that contacts 12 and 13 are shut (block 21). This corresponds to that which happens when the door contact 4 is closed.

As long as there is movement in the passenger compartment of the vehicle, the sensor 1 will emit a voltage to the delay unit 5. The switch 11 is then activated (block 22). When the movement ceases, voltage will no longer be emitted from the sensor 1 to the contact 6. At this stage, the timer function of the delay unit 5 is activated, so that the preset time $t_2$ must elapse before the relay 10 is deactivated, and the switch 11 is deactivated again so that contact between the contacts 12 is broken. The period of time $t_2$ is preferably 15 seconds (block 23). During the entire period of time $t_2$, the switch 11 will thus be closed.

If the sensor 1 detects motion in the passenger compartment of the vehicle during the period of time $t_2$, the delay unit 5 will again be activated (block 24), and the sequence will continue at block 21, subsequent to which the period of time $t_2$ is again initiated in the delay unit 5 when there is no voltage from the sensor 1 (block 23).

During the entire period of time $t_2$, the delay unit 5 will detect a possible voltage from the sensor 1. If the sensor 1 has not detected movement during the period of time $t_2$ (block 25), the relay 10 and thus also the switch 11 will be deactivated when the period of time $t_2$ has expired. This will be registered in the alarm control unit 2 in the same manner as when a door is closed, and will cause the period of time $t_1$ to again be initiated in the alarm control unit 2.

The present invention thus provides a device which initially will detect if the last door has been closed. If this is the case, the alarm will be activated after a period of time $t_1$. If movement is detected during this period of time $t_1$, the alarm will however not be activated; instead a new time delay $t_2$ will be initiated. As long as movement is detected by the sensor 1 during the time delay $t_2$, it will be initiated again.

According to an alternative embodiment of the present invention, initiation of the period of time $t_1$ in the alarm control unit 2 can be excluded. This means that the alarm is activated immediately after the last door has been closed and the period of time $t_2$ has expired. If movement is detected during the period of time $t_2$, it will be initiated again as has been described above.

Figure 3:
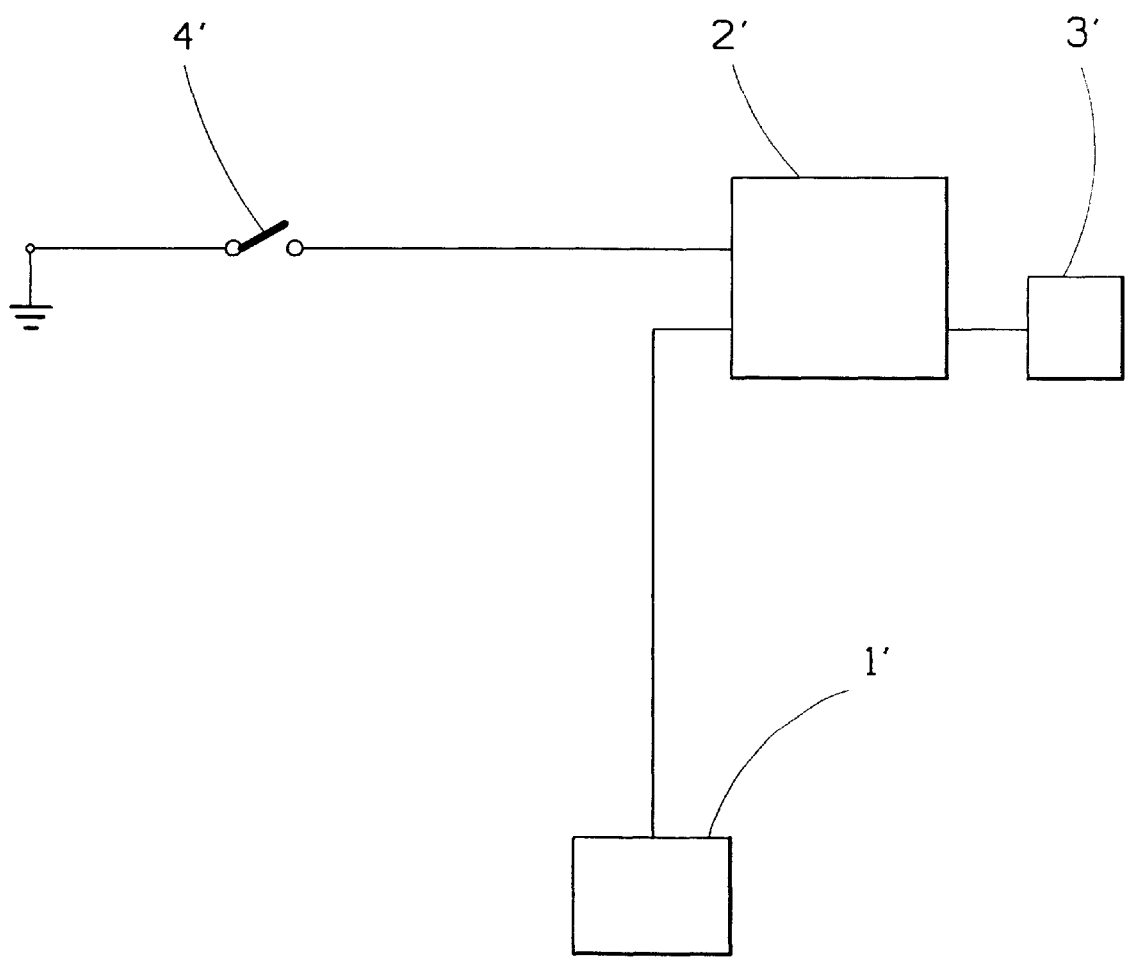
FIG. 3 is a block diagram which schematically illustrates the present invention in a further embodiment.

FIG. 3 shows a further embodiment of the present invention, where a sensor 1' of the above-mentioned kind is connected to an alarm control unit 2', which in turn is connected to an alarm device 3' in order to emit an alarm signal. One or several door contacts 4' are also connected to the alarm control unit 2'.

The alarm control unit 2' detects if the driver has stopped and left the vehicle as has been described above. In this state, the alarm system 2' initiates a delay during a predetermined period of time $t_3$. If the sensor 1 during this time delay $t_3$ detects movement inside the passenger compartment, a voltage will be emitted to the alarm control unit 2. This causes the alarm control unit 2 to enter a state where the alarm function cannot be activated, i.e. an alarm signal cannot be emitted from the alarm device 3'. The alarm control unit 2' will remain in this state until a door is opened and closed again, which is interpreted by the alarm control unit 2' as the driver having left the vehicle. A new initiation of the time period $t_3$ then takes place, and the sequence starts again.

The present invention is not limited to the embodiments shown but can be varied within the scope of the claims. Various kinds of sensors can for example be utilized. Instead of sensors, another sensor which detects the presence of people or animals in the passenger compartment of the vehicle can be used, i.e. a seat sensor which detects if somebody is sitting in a certain seat.

The sensor which is used to detect the fact that the user of the vehicle has left the vehicle can also be of different kinds, for example a door contact (see FIG. 1 and 3), a seat sensor or some other suitable sensor.

The delay unit 5 can consist of a computer-based unit, or can be based on an essentially conventional relay. The delay unit 5 can consist of a separate unit or can be integrated in the alarm control unit 2. In the latter case, the alarm control unit 2 can also be said to be a delay unit.

Finally, it is to be noted that the periods of time $t_1$, $t_2$ and $t_3$ can have different values.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A vehicle alarm device comprising a first motion detection sensor for detecting the presence of living beings within said vehicle and generating a first signal, a second sensor for detecting the exit of a passenger from said vehicle and generating a second signal, an alarm, a controller for activating said alarm based upon receipt of one of said first and second signals, and a time delay unit for initiating a first time delay for activation of said alarm after receipt of said second signal from said controller and for initiating a second time delay for activation of said alarm after receipt of said first signal during said first time delay, to thereby extend said first time delay, and for further initiating said second time delay for activation of said alarm after receipt of said first signal during said second time delay, to thereby further extend said second time delay.

2. The vehicle alarm device of claim 1 wherein said time delay unit comprises a switch connected to said controller, and a relay for actuation of said switch upon receipt of said first signal.

3. The vehicle alarm device of claim 2 wherein said time delay unit initiates said second time delay upon interruption of said first signal, thereby deactuating said switch.

4. The vehicle alarm device of claim 1 wherein said vehicle includes a passenger compartment, and wherein said first motion detection sensor is disposed in said passenger compartment.

5. The vehicle alarm device of claim 1 wherein said vehicle includes at least one door, and wherein said second sensor comprises a door contact associated with said at least one door of said vehicle.

6. A method for activating a vehicle alarm device comprising detecting the motion of a living being within said vehicle and generating a first signal, detecting the exit of a passenger from said vehicle and generating a second signal, activating an alarm based upon receipt of one of said first and second signals, initiating a first time delay for activation of said alarm after receipt of said second signal, initiating a second time delay for activation of said alarm after receipt of said first signal during said first time delay to thereby extend said first time delay, and further initiating said second time delay for activation of said alarm after receipt of said first signal during said second time delay, to further extend said second time delay.

7. The method of claim 6 comprising initiating said second time delay upon interruption of said first signal.

* * * * *